United States Patent [19]

Bolger

[11] Patent Number: 4,600,945
[45] Date of Patent: Jul. 15, 1986

[54] DIGITAL VIDEO PROCESSING SYSTEM WITH RASTER DISTORTION CORRECTION

[75] Inventor: Thomas V. Bolger, Merchantville, N.J.

[73] Assignee: RCA Corporation, Princeton, N.J.

[21] Appl. No.: 480,907

[22] Filed: Mar. 31, 1983

[51] Int. Cl.[4] .......................... H04N 5/14; H04N 5/68
[52] U.S. Cl. ...................................... 358/160; 358/242
[58] Field of Search ............... 358/160, 325, 339, 242, 358/163, 51, 65; 315/370; 307/269, 595; 328/187, 189

[56] References Cited

U.S. PATENT DOCUMENTS

| | | | |
|---|---|---|---|
| 3,893,174 | 7/1975 | Sano et al. | 358/65 |
| 4,032,888 | 6/1977 | Broyles et al. | 358/208 |
| 4,191,998 | 3/1980 | Carmody | 307/269 |
| 4,277,797 | 7/1981 | Dangschat et al. | 358/21 R |
| 4,281,340 | 7/1981 | Mitamura et al. | 358/67 |
| 4,301,473 | 11/1981 | Wallace et al. | 358/242 |

FOREIGN PATENT DOCUMENTS 0051092 12/1982 European Pat. Off. .
WO81/00940 4/1981 PCT Int'l Appl. .

*Primary Examiner*—James J. Groody
*Assistant Examiner*—David E. Harvey
*Attorney, Agent, or Firm*—Eugene M. Whitacre; Paul J. Rasmussen; Joseph J. Laks

[57] ABSTRACT

In a color television receiver in which video signals are processed in digital form, the rate at which the digital video samples are supplied to a digital-to-analog converter arrangement is varied in a predetermined manner to produce a display that is substantially free of raster distortion. The digital video samples are first entered into a digital store such as a FIFO and then read out of the FIFO by a selected one of four read clocks. The read clocks are of the same frequency but of different phase. By selecting different read clocks to apply to the digital store, the rate at which the store reads out the digital samples is varied.

15 Claims, 6 Drawing Figures

DIGITAL VIDEO PROCESSING SYSTEM WITH RASTER DISTORTION CORRECTION

This invention relates to a digital video signal processing system with raster distortion correction capability.

In digital television receivers, an analog baseband video signal is sampled and the samples converted to representative digital samples by an analog-to-digital converter. The digital samples are processed in a digital comb filter to produce digital signals representing separated luminance and chrominance information. The digital luminance and chrominance information containing signals are then processed in respective channels of a digital signal processor to produce digital color mixture signals such as I and Q signals and digital luminance or Y signals. A digital matrix may be used to combine the I, Q and Y signals to produce R, G and B primary color digital samples. The digital samples are then applied to respective R, G and B digital-to-analog converters to produce the analog R, G and B drive voltages for driving the cathodes of a color picture tube.

It is possible to correct various scanning and other raster distortions by delaying the video being supplied to the picture tube cathodes. A feature of the invention is to introduce the video delay while the picture information is still in sample form. Binary coded digital samples that contain picture information and that are in synchronous relationship with a synchronizing signal are developed by a digital processor. A scanning generator is operated synchronously with the synchronizing signal for developing a raster display in a picture display device. A digital-to-analog converter arrangement is provided with these digital samples and develops an analog signal that is representative of the digital samples to thereby produce a display of the picture information in the raster. To produce a display that is substantially free of raster distortion, the rate at which the digital-to-analog converter arrangement is being supplied with the binary coded digital samples is varied.

In accordance with an aspect of the invention, the digital samples, prior to their being supplied to the digital-to-analog converter arrangement, are entered into a digital store, such as a first-in-first-out, FIFO. A clock generator develops a plurality of different read clocks for the FIFO. A read clock selecting circuit, such as a memory controlled multiplexer chooses successive ones of the pluralilty of read clocks to apply to the digital store to vary the rate at which the store reads out the digital samples.

Figure 1:
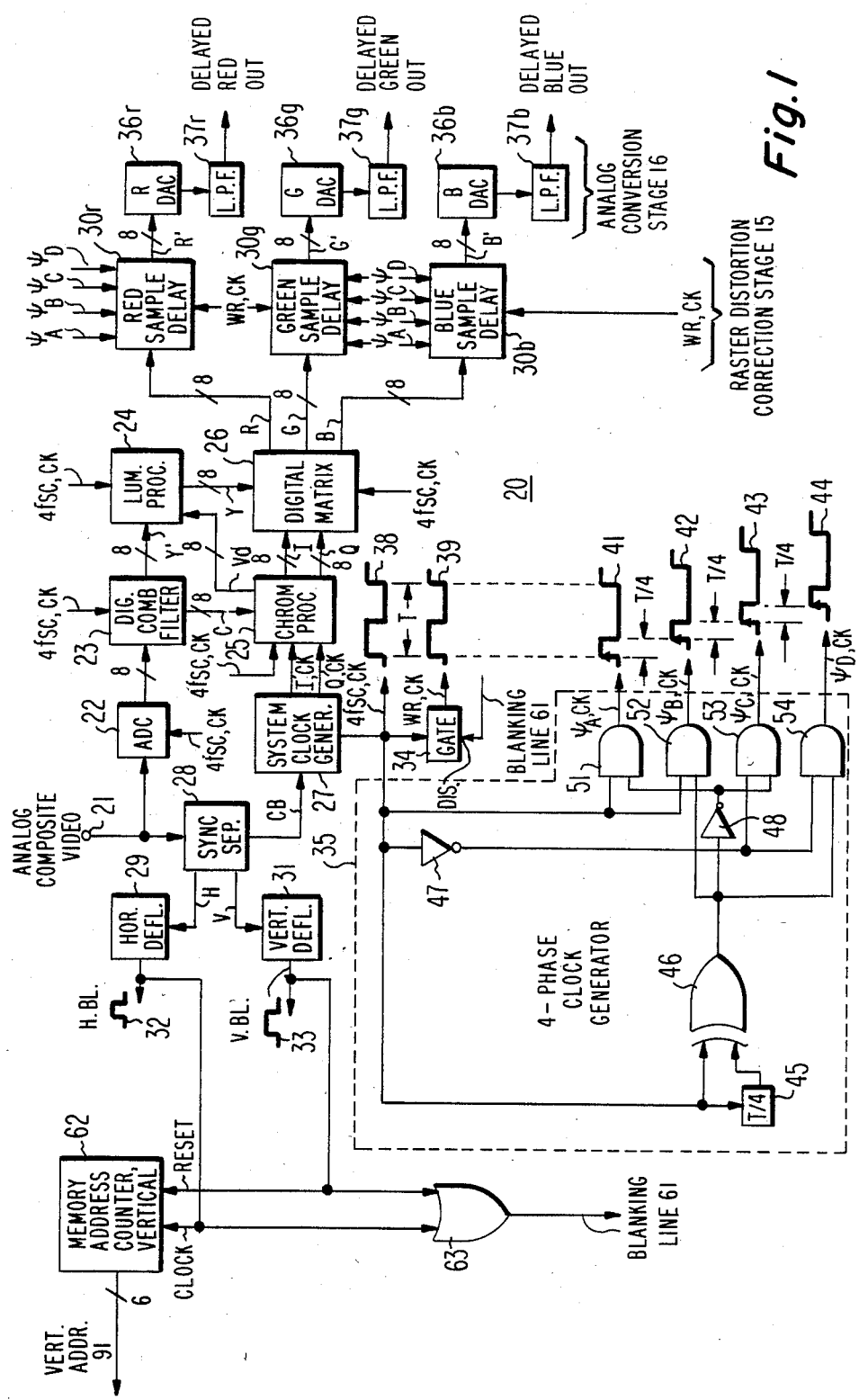
FIG. 1 illustrates a digital video signal processing system with raster distortion correction capability embodying the invention.

In the digital television system illustrated in FIG. 1, a conventional video detector, not illustrated, develops an analog composite video signal at a terminal 21. The composite video signal is applied to a sync separator 28 to develop horizontal sync pulses along a signal line H for a horizontal deflection circuit 29 and vertical sync pulses along a signal line V for a vertical deflection circuit 31. A horizontal blanking pulse 32 and a vertical blanking pulse 33 are respectively developed by horizontal deflection generator 29 and vertical deflection generator 31 for use by various television receiver signal processing circuits. Horizontal and vertical blanking pulses 32 and 33 are combined by an OR gate 63 to produce a blanking signal along a line 61 for resetting various digital counters, further referenced below.

Sync separator 28 also develops a color burst reference signal that is applied along a signal line CB to a system clock generator 27 of a digital video signal processing system 20. System clock generator 27 develops a $4f_{sc}$ frequency system clock synchronized with the color burst reference signal, where $f_{sc}$ is the frequency of the color subcarrier reference signal. System clock generator 27 also develops various other clock signals such as the I-clock and Q-clock signals. The I-clock signal is generated in synchronism with the occurrence of the I-axis phase points of the color burst reference signal contained within the composite video signal and the Q-clock signal is generated in synchronism with the occurrence of the Q-axis phase points of the color burst reference signal.

The analog composite video signal developed at terminal 21 is applied to an analog-to-digital converter ADC 22. Analog-to-digital converter 22 samples the video signal at the $4f_{sc}$ clock rate to produce digital samples of the video signal. Each digital sample may comprise, for example, an 8-bit binary coded word in, illustratively, offset two's complement notation.

The digitized samples produced by ADC 22 are applied to an input of a digital comb filter 23. Comb filter 23 produces a separated digital luminance signal Y' that is applied to a luminance signal processor 24. Luminance processor 24 processes the digitized luminance signal Y' in accordance with various control signal inputs such as viewer controlled constrast control, not illustrated in FIG. 1, to produce a luminance signal Y at a plural bit output data line thereof.

Comb filter 23 also produces a separated digital chrominance signal C that is applied to an input of a chrominance processor 25. Chrominance processor 25 may include a chrominance amplifier that amplifies the digital chrominance signal in response to a viewer controlled color saturation control signal and may also include a chroma digital peaker, that modifies the response characteristics exhibited by the chrominance signal to compensate for undesirable response characteristics of the intermediate frequency circuitry preceding the analog video detector. Chrominance processor 25 includes a digital color demodulator that demodulates on the I and Q phase points of the color burst reference signal to produce 8-bit digital I and Q samples. Chrominance processor 25 may also include a lowpass filter to recover additional vertical detail for the luminance signal Y. The additional vertical detail is provided by luminance processor 24 along a signal line Vd.

The I and Q digital samples developed by chrominance processor 25 and the Y digital samples produced by luminance processor 24 are combined in a digital matrix 26 to produce the digital R, G and B primary color samples. The operation of digital matrix 26 may be similar to that described in U.S. patent application Ser. No. 444,521, filed Nov. 26, 1982, now U.S. Pat. No. 4,503,454, by H. G. Lewis, Jr. entitled, COLOR TELEVISION RECEIVER WITH A DIGITAL PROCESSING SYSTEM THAT DEVELOPS DIGITAL DRIVER SIGNALS FOR A PICTURE TUBE, herein incorporated by reference.

The red primary color digital samples are applied to a sample delay generator 30r that outputs the samples along a signal line R' after being delayed in a manner hereinafter to be described. The delayed red digital samples are applied to a digital-to-analog converter 36r to produce a delayed analog red output signal after filtering by lowpass filter 37r. In similar manner, delayed analog green and blue output signals are developed from the digital green and blue samples after the samples are delayed by delay generators 30g and 30b, converted to analog representation by digital-to-analog converters 36g and 36b, and filtered by lowpass filters 37g and 37b.

Red, green and blue sample delay generators 30r, g, b, combine to form a raster distortion correction stage 15 that operates to produce a display of the color picture information that is contained in the R, G and B samples such that the display is substantially free of distortions introduced into the scanned raster. Consider, for example, the effects of a color misregistration such as horizontal misconvergence in the scanned raster of an in-line color picture tube. Due to misconvergence, in any given scan line, red, green and blue digital samples that are generated coincident in time may, nevertheless, be displayed spacially separated along the horizontal line.

In accordance with an aspect of the invention, such raster distortion is compensated by correction stage 15 of FIG. 1 by appropriately delaying relative to one another, in predetermined amounts, the red, green and blue digital samples prior to their conversion into analog signals by digital-to-analog converters 36r, g, b. Similarly to correct for other types of raster scanning distortion, such as one type of asymmetrical horizontal scanning non-linearity produced by yoke losses, the digital samples of all three primary colors may be equally delayed by amounts that vary from the beginning to the end of horizontal scan.

In accordance with an aspect of the invention, each of the red, green and blue sample delay generators 30r, g, b, comprises a digital store such as a first-in-first-out, FIFO, digital store or memory. Undelayed R, G or B digital samples, supplied by digital matrix 26, are stored in the respective FIFO stores and are clocked in at the rate of a write clock signal 39, illustrated in FIG. 1. Write clock 39 is derived from the $4f_{sc}$ system clock 38 after being passed through a gate 34. Gate 34 is disabled during horizontal and vertical blanking in response to the blanking signal provided on line 61 to prevent the clocking in of information into the FIFO's during these intervals.

Samples stored in the FIFO of delay generator 30r, 30g, or 30b, are read out at a variable, selectable rate that depends upon which one of four read clocks $\psi_A$, $\psi_B$, $\psi_C$, and $\psi_D$, is selected. The four read clocks have the same frequency as the write clock, namely, $4f_{sc}$, but differ in phase from one another by one-quarter period. As illustrated by waveforms 41–44, the positive portion of each waveform is of duration, T/4, where $T=1/(4f_{sc})$. The leading or positive going edge of each waveform, indicated by the upwardly pointing arrows, is successively displaced or delayed by one-quarter period as one progresses from waveform 41 to waveform 44. It is the leading edge of the selected read clock $\psi_A$, $\psi_B$, $\psi_C$ or $\psi_D$ that clocks or reads out a stored digital sample from the respective FIFO.

The four differently phased read clocks 41–44 are developed from the $4f_{sc}$ clock signal 38 by a four-phase clock generator 35. Four-phase clock generator 35 comprises a quarter period delay stage 45 for delaying the $4f_{sc}$ clock by T/4, an exclusive OR gate 46, inverters 47 and 48, and AND gates 51–54. The four read clocks 41–44 are developed at the outputs of AND gates 51–54.

Figure 4:
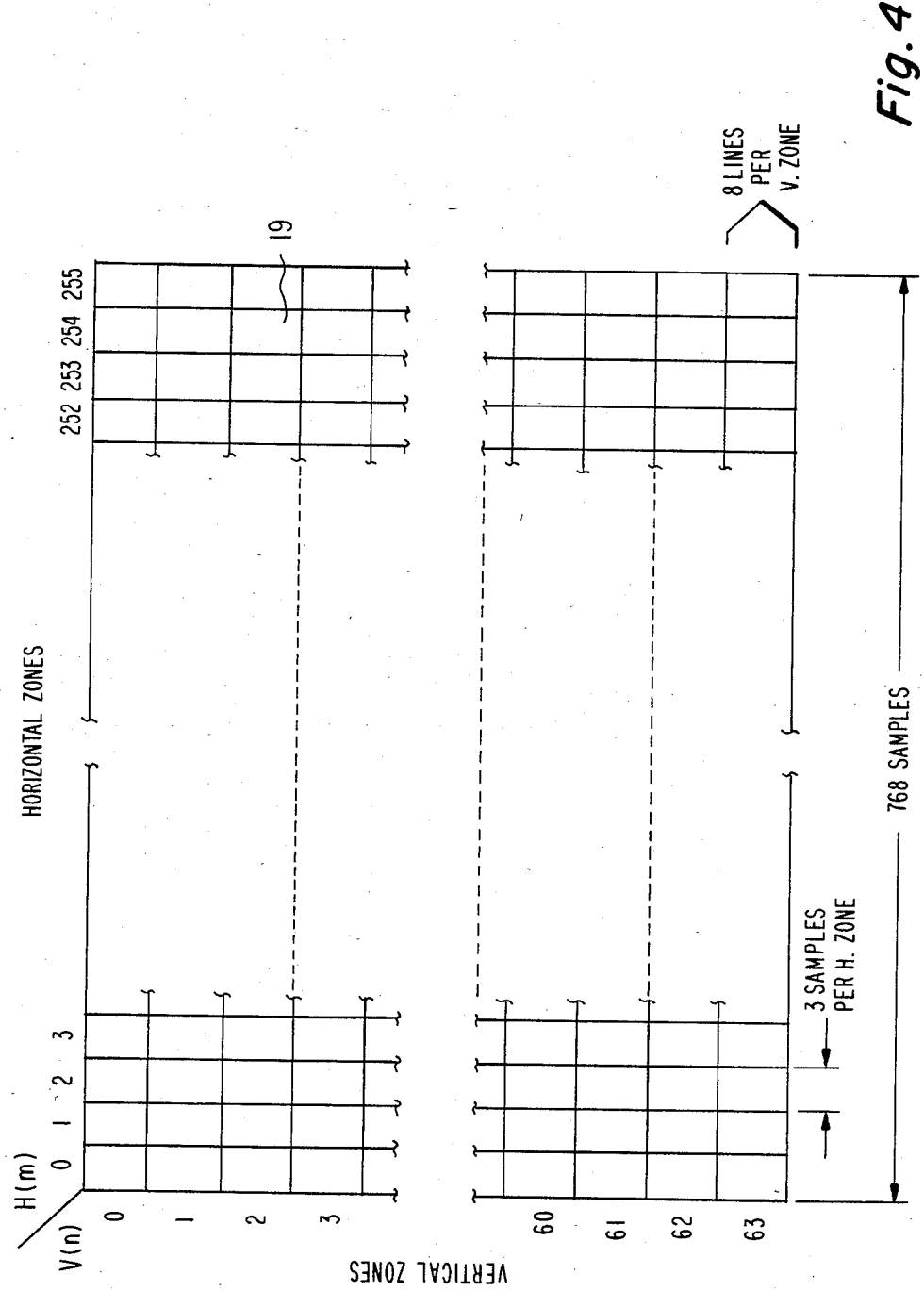
FIG. 4 illustrates the division of a raster into grid regions of 256 horizontal zones by 64 vertical zones and for which raster distortion correcting information is required so as to properly operate the video sample delay circuits of FIG. 1.

To determine the appropriate one of the four read clocks to select at a given point so as to provide raster distortion correction, the raster, schematically illustrated in FIG. 4, is divided into a grid network of vertical and horizontal zones. Associated with each grid region 19 of the network is a selected one of the four read clocks $\psi_A$ through $\psi_D$. Each of the read clocks may be represented in binary form by a corresponding 2-bit binary word located in a clock phase select memory to be further described.

Depending upon the severity of the raster distortion, and the frequency at which the clock selection is to be updated, 256 horizontal zones is a sufficient number of line subdivisions required per active portion of a horizontal line. With digital R, G and B samples being developed by digital matrix 26 of FIG. 1 at a $4f_{sc}$ rate, the active or unblanked portion of each horizontal line encompasses approximately 768 digital samples. Thus, assuming each horizontal zone encompasses an equal number of digital samples, the 256 horizontal zones H(m), m=0, 2, 3, ... 255, encompass three samples per zone.

Again, depending upon the severity of the raster distortion, the read clock phase selection need not be updated every horizontal line, but may, for example, be updated every 8 lines. Thus with approximately 512 active lines per frame, the grid network of FIG. 4 may be divided into 64 vertical zones. To keep track of the vertical zone being scanned, a memory address counter 62, in FIG. 1, is clocked by horizontal blanking pulses 32 and reset by vertical blanking pulses 33 to produce a 6-bit address word on a vertical address line 91 that is representative of the 64 vertical zones V(n) of FIG. 4, n=0, 2, 3, ... 63.

Figure 2:
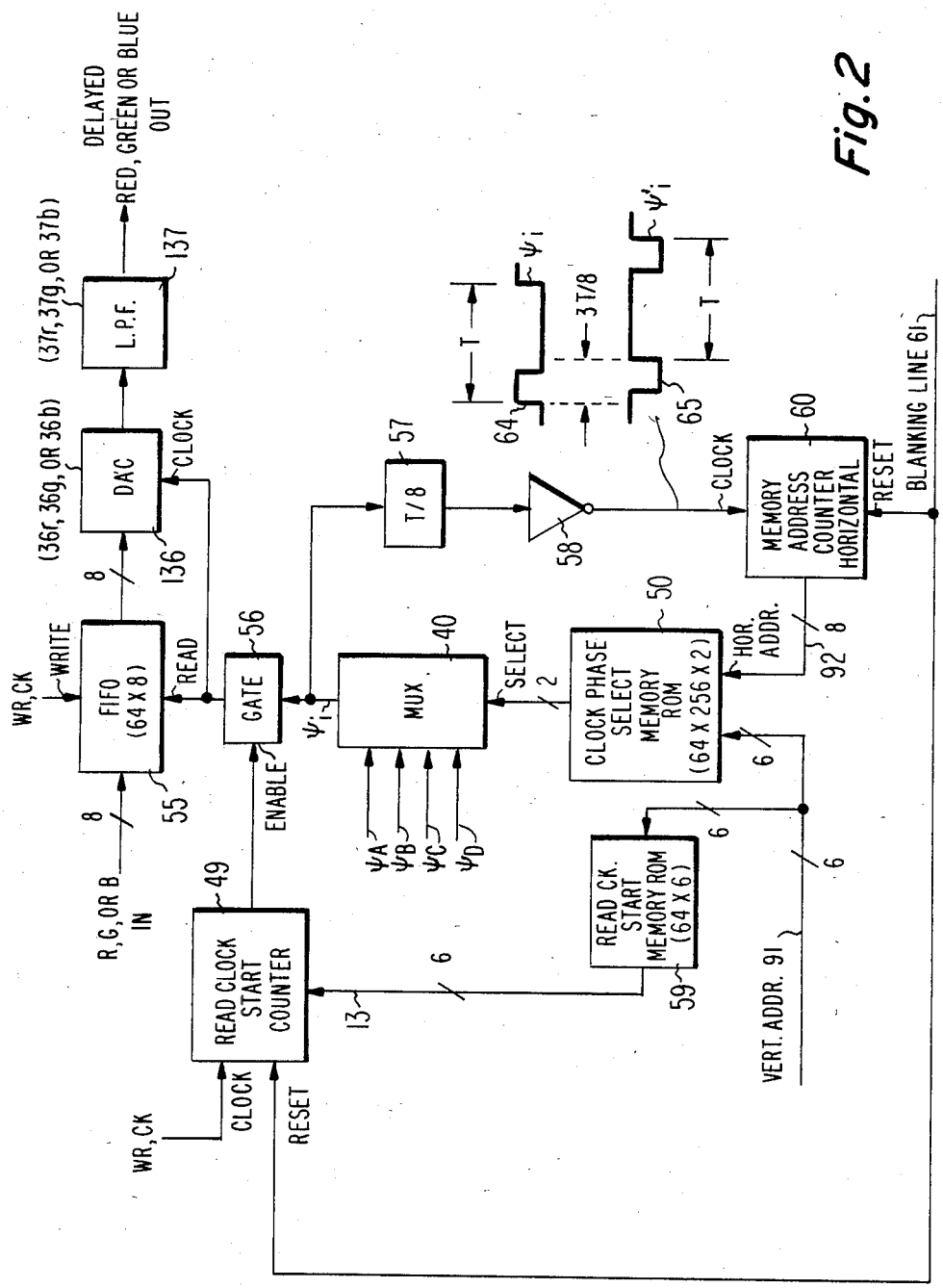
FIG. 2 illustrates a portion of the system of FIG. 1 including a specific embodiment, in accordance with the invention, of a red, green or blue digital sample delay circuit.

FIG. 2 illustrates a specific embodiment of a red, green or blue digital sample delay generator 304, 30g, or 30b and its associated digital-to-analog converter 36r, 36g, or 36b and lowpass filter 37r, 37g, or 37b. The elements of FIG. 2 are repeated 3 times in the system of FIG. 1, once in each of the three processing channels, R, G and B.

In FIG. 2, red, green or blue digital samples obtained from digital matrix 26 of FIG. 1 are clocked in or written into a first-in-first-out, FIFO, digital store 55 at the $4f_{sc}$ rate of the write clock 39 of FIG. 1. The four quadrature phase read clocks $\psi_A$ through $\psi_D$ are applied to a multiplexer stage 40. The output clock $\psi_i$ of multiplexer 40 is a selected one of the four quadrature phase clocks.

A clock phase select memory 50 determines which clock $\psi_i$ of the four clocks is actually selected for a given zone by the multiplexer. A 2-bit word is supplied to the select port of multiplexer 40 by clock phase memory 50. The address of the 2-bit select word and the value thereof are functions of the particular horizontal and vertical zone being scanned at a given instant.

The address of the vertical zone being scanned is supplied to clock phase select memory 50 along the 6-bit vertical address line 91. The address of the horizontal zone being scanned is supplied along an 8-bit horizontal address line 92. The two address lines 91 and 92 combine to establish a unique location in memory 50 to retrieve the 2-bit clock phase select information for multiplexer 40.

The phase select information may be entered into memory 50 during assembly of the television receiver. The information may be obtained either through analysis of the type of error that is to be corrected or through on-line inspection of the errors observed in a test pattern displayed on the screen of the picture tube in question.

The selected clock $\psi_i$ is applied to the read clock terminal of FIFO 55 after first passing through a gate 56. The leading edge of the selected read clock $\psi_i$ reads or clocks out a stored digital sample from FIFO 55 on a first-in-first-out basis. The output digital sample from FIFO 55 is applied to a digital-to-analog converter 136 which is the appropriate one of the red, green and blue digital-to-analog converters 36r, 36b and 36g. Digital-to-analog converter 136 is clocked by the same clock $\psi_i$ as applied to FIFO 55. The analog output of digital-to-analog converter 136 is applied to lowpass filter 137 which is the appropriate one of lowpass filters 37r, 37g and 37b of FIG. 1, to develop the delayed red, green or blue analog video output.

The phase selected clock $\psi_i$, illustrated in FIG. 2 as waveform 64, is also applied to a delay stage 57 that delays the signal by ⅛ period. The delayed signal is inverted by inverter 58 and applied as a clock input signal $\psi'_i$ to a horizontal memory address counter 60. Assume that memory address counter 60 is incremented at the leading edge of clock signal $\psi'_i$, as illustrated by waveform 65 of FIG. 2. This results in the counter being incremented after a delay of ⅝ of a period from the development of the leading edge of the phase selected clock $\psi_i$ that clocks out the digital samples from FIFO 55. Such an arrangement assures that only one read clock $\psi_i$ will be generated during the scan of a given horizontal zone, even when differently phased read clocks are successively selected.

If the same number of digital samples, e.g., three samples, for each of the 256 horizontal zones are to be read out of FIFO 55 by the repetition of the same read clock $\psi_i$ before a new clock phase selection is made, then horizontal address memory counter 60 may comprise an 8-bit counter reset by the horizontal blanking pulses developed along blanking line 61 and incremented by the counter clock signal $\psi'_i$. It may be desirable, however, when correcting for certain types of raster distortion, such as misconvergence, to update the read clock phase selection at some interval other than three samples per horizontal zone in different portions of the line scan. For example, at the beginning and end of a horizontal line scan, the amount of misconvergence changes relatively rapidly, whereas in the center of a horizontal line scan, the amount of misconvergence changes relatively slowly. Thus, it would be desirable from the point of view of correcting for misconvergence errors, to update the clock phase selection for FIFO 55 every two digital samples per horizontal zone at the beginning and end of each horizontal line scan, but update the selection at longer intervals such as every five digital samples at the center of horizontal line scan. Other clock phase updating schemes are also possible using different numbers of blocks and horizontal zones per block.

Figure 3:
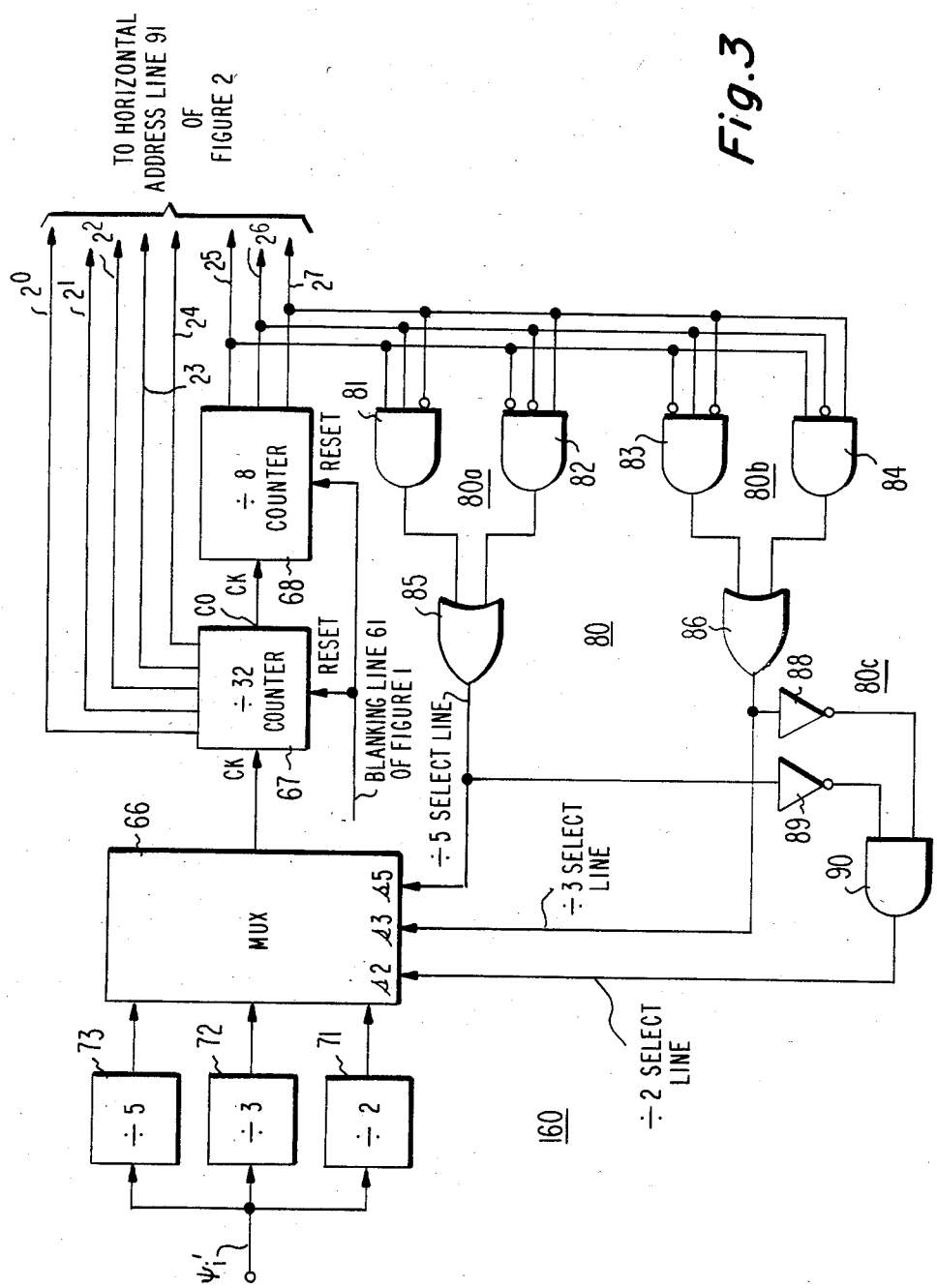
FIG. 3 illustrates a specific embodiment of the horizontal zone memory address counter of FIG. 2.

The circuit of FIG. 3 illustrates a specific embodiment 160 of horizontal memory address counter 60 of FIG. 2 that is capable of updating the clock phase selection $\psi_i$ after different numbers of digital samples have been outputed from FIFO 55, depending upon which horizontal zone is being addressed. As illustrated schematically in FIG. 5, each vertical zone V(n) is divided into eight blocks, each block encompassing thirty-two horizontal zones. When the picture information for outer blocks 0, 1, 6, or 7 is to be read out of FIFO 55, each horizontal zone encompasses two digital samples. The clock phase selection is therefore updated every two digital samples in these blocks. For intermediate blocks 2 and 5, each horizontal zone encompasses three digital samples. For center blocks 3 and 4, each horizontal zone encompasses five digital samples.

Figure 5:
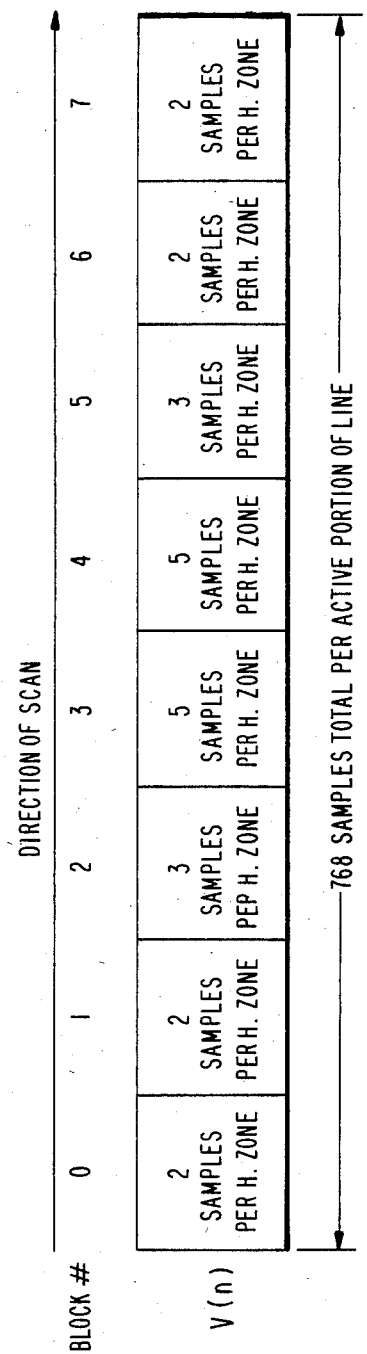
FIG. 5 illustrates the division of each vertical zone of FIG. 4 into 8 blocks, with each block having 32 horizontal zones, wherein different numbers of digital samples are associated with the horizontal zones in a given block.

The horizontal memory address counter 160 of FIG. 3 is designed to implement the clock phase selection update scheme schematically represented in FIG. 5. The clock signal $\psi'_i$ for horizontal memory address counter 160 is applied to each of divide-by-2 counter 71, divide-by-3 counter 72, and divide-by-5 counter 73. The outputs of counters 71–73 are applied to a multiplexer stage 66. Multiplexer 66 selects the output of one of the three counters 71–73 to apply as a clock signal to a divide-by-32 counter 67, depending upon which one of the eight blocks of FIG. 5 is being displayed. Thus, for example, if block number 0 is being displayed, select line s2 of multiplexer 66 is activated to pass through the output of divide-by-2 counter 71 to the clock input of counter 67. Counter 67 is therefore incremented at the leading edge of every second counter clock $\psi'_i$. This results in counter 67 being incremented every two digital samples during the read out of the picture information for block number 0.

Five output lines of counter 67, $2^0$–$2^4$, provide in binary form an output of the 32 counts available from counter 67. These counts represent the 32 horizontal zones of a given block of FIG. 5. The five output lines from counter 67 are sent to clock phase select memory 50 of FIG. 2 as the five least significant bits of the 8-bit address word developed along horizontal address line 92.

The carry-out terminal CO of counter 67 is coupled to the clock terminal of a divide-by-8 counter 68. After every 32 counts of counter 67, counter 68 is incremented by one count. The three output lines of counter 68 form a 3-bit binary word whose value corresponds to the block number being displayed. The three output lines, $2^5$–$2^7$, are sent to clock phase select memory 50 as the three most significant bits of the 8-bit address word developed along horizontal address line 92.

The three output lines of counter 68 are coupled to a decoder 80 that determines the block being displayed and activates accordingly the appropriate one of select terminals s2, s3 and s5 of multiplexer 66. The divide-by-5 decoder portion 80a of decoder 80 comprises AND gates 81 and 82 and OR gate 85. When the output of divide-by-8 counter 68 is 3 or 4, the divide-by-5 select line at the output of OR gate 85, goes high, activating select terminal s5 to enable the output of divide-by-5 counter 73 to be passed along to the clock input terminal of counter 67. The decoder portion 80b, comprising AND gates 83 and 84 and OR gate 86, produces a high signal on the divide-by-3 select line to activate the s3 select terminal of multiplexer 66 when the output of counter 68 is 2 or 5. When select terminal s3 is activated, the output of divide-by-3 counter 72 is passed along by multiplexer 66 to the clock terminal of counter 67. The decoder portion 80c, comprising inverters 88 and 89 and AND 90, produces a high signal on the divide-by-2 select line to activate the s2 select terminal when the output of counter 68 is 0, 1, 6 or 7. When select terminal s2 is activated, the output of divide-by-2 counter is passed along to the clock terminal of counter 67.

Figure 6:
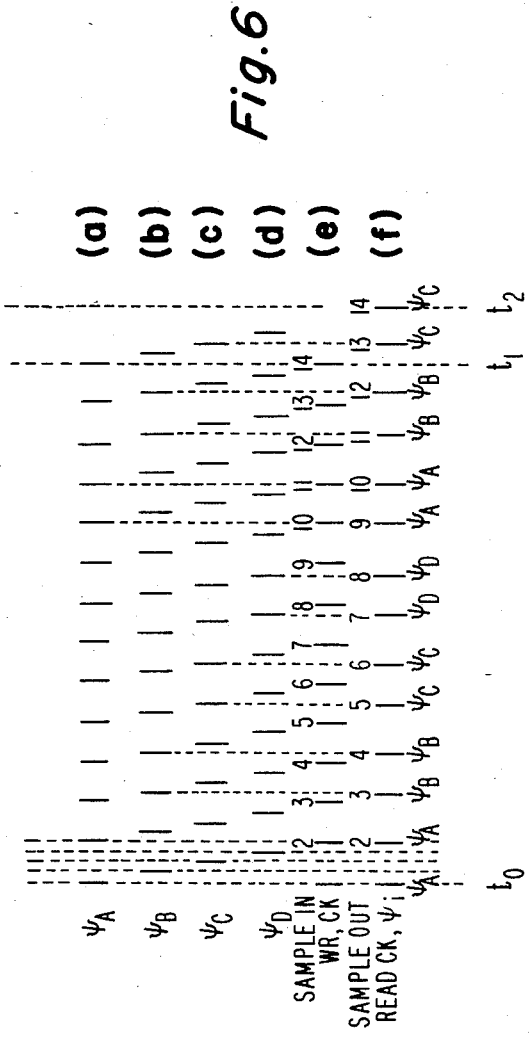
FIG. 6 illustrates a sequence of read clock selections by the circuit of FIG. 2 during a given interval within a horizontal scan.

An example of the operation of raster distortion correction stage 15 of FIG. 1 will now be provided with the aid of the timing diagrams of FIG. 6. FIGS. 6a–6d illustrate the leading edges of the four quadrature phased read clocks $\psi_A$ through $\psi_D$. Assume, for explanatory purposes, that it is desired to correct asymmetrical nonlinearity distortion of horizontal scan. Thus, when displaying, in a given scan line, the red, green or blue digital samples of illustratively block number 7, each digital sample, on the average, should be read out of FIFO 55 at a slower rate than the read out rate for the digital samples of illustratively block number 0.

FIG. 6e illustrates the leading edges of 14 representative write clocks 39 of FIG. 1 that clock into FIFO 55 fourteen digital samples associated with block number 7. Digital sample number 1 is clocked in at time $t_0$, and digital sample number 14 is clocked in at time $t_1$. To correct asymmetrical nonlinearity distortion, the 14 digital samples should be clocked out, on the average, at a slower rate than the clock-in rate. The clock-out rate should be such that if sample number 1 is clocked out at time $t_0$ then sample number 14 should be clocked out at $t_2$ of FIGS. 6e and 6f, a time that is delayed by an amount $t_2-t_1$ from the time sample number 14 was clocked into FIFO 55.

FIG. 6f illustrates the leading edges of the 14 selected read clocks $\psi_i$, selected in accordance with the data stored in the appropriate red, green or blue clock phase select memory 50 of FIG. 2. Assume arbitrarily, that read clock $\psi_A$ is selected at time $t_0$. Because digital samples in block number 7 of FIG. 5 are to be processed, the clock phase selection is updated by the circuit of FIG. 3 every other digital sample, as indicated by an inspection of FIG. 6f. To produce the required individual sample delays, on the average, and the overall delay of $t_2-t_1$, in the aggregate, a new read clock is selected at every read clock update. Each selected read clock has a phase delay of one-quarter period from the previously selected clock. Thus, samples 1, 3, 5, etc. are read out by clock $\psi_A$, $\psi_B$, $\psi_C$, etc. In this manner, sample delay produces correction of the effects of raster distortion.

It may be desirable to provide an initial predetermined amount of delay at the beginning of each line scan before any red, green or blue digital sample is read out of FIFO 55 of FIG. 2. For a FIFO with a capacity of storing 64 8-bit binary words, an initial delay of up to 64 write clock pulses, or 4.5 microsecond, may be provided. Such maximum delay represents the maximum difference that could reasonably be expected between minimum and maximum sample delay needed to correct for a given distortion. A nominal delay of 32 clocks to read out the first digital sample of a given line permits an advance or delay of up to 32 clocks for the first digital sample of any other line relative to the first sample of the given line.

In the circuit of FIG. 2, the initial delay of the read out is accomplished by a counter 49 and gate 56. The desired amount of initial delay is loaded into counter 49 at the beginning of each horizontal scan, after the counter is reset by the blanking pulses appearing on blanking line 61. The initial delay is represented by a 6-bit binary word developed on a data line 13. The 6-bit word corresponds to the number of write clock pulses that are to elapse before gate 56 permits read clock pulses to pass through to FIFO 55.

The 6-bit word is developed on data line 13 by a memory 59. The memory is addressed by the 6-bit vertical address word developed on address line 91. Thus the amount of initial delay is the same for each of the 8 scan lines within a given vertical zone and is updated at the beginning of each vertical zone.

If the raster distortion that is to be corrected is severe enough, it may be desirable to update the amount of initial delay more frequently—at the beginning of each of the 512 line scans in a given frame, for example. In this circumstance, read clock start memory may comprise a 512×6 ROM that is addressed by a suitable counter loaded with the appropriate count and decremented each line scan.

Using a sample delaying technique by means of different read clocks, as outlined above, has several advantages over other techniques, such as supplying digital samples to analog conversion stage 16 of FIG. 1 at a variable rate that is established by a voltage controlled oscillator. The total frequency range of operation of a VCO required is large. It is relatively difficult to design a VCO with a large frequency range while still maintaining linearity of operation. A relatively exacting frequency stability may also be required. If the red, green and blue digital samples are subject to different delays, then three relatively complex VCO circuits are required. Using a VCO, an additional digital-to-analog converter associated therewith may be required to convert digital correction information to an analog correction voltage.

What is claimed is:

1. A raster distortion correction arrangement for a television display system that includes a digital signal processing system, comprising:
   means for developing binary coded digital samples that contain picture information and that are in synchronous relationship with a synchronizing signal;
   a scanning generator operated synchronously with said synchronizing signal for developing a raster in a picture display device;
   a digital-to-analog converter arrangement being provided with said digital samples for developing an analog drive signal that is representative of said digital samples to produce in said raster a display of said picture information, said raster being subject to error that tends to introduce distortion into the display of said picture information;
   means for storing said digital samples for subsequent read out;
   means for developing a plurality of different read clocks; and
   means for repetitively selecting an appropriate one of said plurality of read clocks to apply to said digital sample storing means to vary the rate at which said storing means reads out said digital samples to produce a display of said picture information corrected for said distortion.

2. An arrangement according to claim 1 wherein said storing means comprises a first-in-first-out digital store, with the samples being clocked in by a write clock and with the samples being clocked out by a succession of selected ones of said plurality of read clocks.

3. An arrangement according to claim 1 wherein said plurality of read clocks have the same frequency but different phase relationships with one another.

4. An arrangement according to claim 1 wherein said raster display is partitioned into a plurality of zones and wherein said read clock selecting means includes a memory having addresses with which said plurality of zones are associated and in which are stored data to select a read clock that enables a given digital sample to be read out of said storing means at an instant that permits the picture information contained therein to be displayed in a given one of said plurality of zones so as to produce a display of said picture information that is substantially free of said distortion.

5. An arrangement according to claim 4 including a counter for providing address data to said memory and means coupled to said read clock selecting means for developing a clock signal for said counter that is indicative of the selected one of said plurality of read clocks.

6. An arrangement according to claim 4 including means for developing during successive intervals within line scan memory addresses that are associated with said plurality of zones and means for selecting different durations for said successive intervals in accordance with the zone being addressed.

7. An arrangement according to claim 4 wherein said plurality of read clocks have the same frequency but different phase relationships with one another.

8. An arrangement according to claim 4 including means coupled to said digital sample storing means for delaying the read out of the stored digital samples from the start of line scan by a given amount of delay that varies in accordance with the zone being scanned.

9. An arrangement according to claim 8 wherein said read out delaying means comprises a read clock gate coupled to said digital sample storing means and having applied thereto the selected read clock, a counter coupled to said gate and activated at said start of line scan to enable said gate upon the completion of the count stored therein and a memory for inserting a count in said counter that delays the enablement of said gate by said given amount of delay.

10. A raster distortion correction arrangement, comprising:
   means for developing successive video samples that are in synchronous relationship with a synchronizing signal;
   a scanning generator operated synchronously with said synchronizing signal for developing a raster, said raster being subject to error that tends to introduce distortion into the raster display of the picture information contained in said video samples;
   means for storing said video samples for subsequent read out;
   a clock generator capable of generating a plurality of read clocks;
   means coupled to said clock generator and responsive to a selection signal for enabling successive ones of said plurality of read clocks to be applied to said storing means for reading out the stored video samples at a rate determined by the selected read clocks; and
   means for generating a selection signal in respect to said raster distortion that causes said stored video samples to be read out at a rate that produces a display of said picture information corrected for said distortion.

11. An arrangement according to claim 10 wherein said clock generator is capable of generating a plurality of read clocks having the same frequency but different phase relationships with one another.

12. An arrangement according to claim 11 wherein said selection signal responsive means comprises a multiplexer for passing through a selected one of said read clocks.

13. An arrangement according to claim 12 wherein said selection signal generating means comprises a memory having locations in which data are stored representative of said selection signal and means for addressing said memory to generate said selection signal at a memory output.

14. An arrangement according to claim 13 wherein said storing means comprises a first-in-first-out digital store, with the samples being clocked in by a write clock and with the samples being clocked out by a succession of selected ones of said plurality of read clocks.

15. An arrangement according to claim 13 including means coupled to said digital sample storing means for delaying the read out of stored digital samples from the start of line scan by a given amount of delay that varies in accordance with the line being scanned.

* * * * *